(12) United States Patent
Qiang et al.

(10) Patent No.: US 12,468,900 B2
(45) Date of Patent: Nov. 11, 2025

(54) CATALOG-BASED ITEM LISTING ENHANCEMENT

(71) Applicant: eBay Inc., San Jose, CA (US)

(72) Inventors: Lili Qiang, Los Altos, CA (US); Dongdong Guo, Saratoga, CA (US)

(73) Assignee: eBay Inc., San Jose, CA (US)

( * ) Notice: Subject to any disclaimer, the term of this patent is extended or adjusted under 35 U.S.C. 154(b) by 178 days.

(21) Appl. No.: 18/522,073

(22) Filed: Nov. 28, 2023

(65) Prior Publication Data

US 2025/0173518 A1    May 29, 2025

(51) Int. Cl.
*G06F 40/40*    (2020.01)
*G06Q 30/0601*    (2023.01)

(52) U.S. Cl.
CPC ......... *G06F 40/40* (2020.01); *G06Q 30/0603* (2013.01); *G06Q 30/0627* (2013.01)

(58) Field of Classification Search
None
See application file for complete search history.

(56) References Cited

U.S. PATENT DOCUMENTS

| | | | |
|---|---|---|---|
| 8,521,614 B1 * | 8/2013 | Yalamanchi | G06Q 30/06 705/27.1 |
| 2021/0406993 A1 * | 12/2021 | Sethi | G06N 3/044 |
| 2023/0146336 A1 * | 5/2023 | Wang | G06N 3/045 705/26.1 |

* cited by examiner

*Primary Examiner* — Antim G Shah
(74) *Attorney, Agent, or Firm* — FIG. 1 Patents

(57) ABSTRACT

Catalog-based item listing enhancement is described. A matching item from a collection of items may be selected to match an item listing by at least one of an aspect matching model trained using a catalog of the collection of items and a language model trained using a database of item listings. The item listing may be updated based on an entry for the matching item in the catalog.

20 Claims, 8 Drawing Sheets

CATALOG-BASED ITEM LISTING ENHANCEMENT

BACKGROUND

Productization refers to the process of transforming diverse product data into a structured, standardized, and easily navigable format that enhances user interaction with listings of an online platform. However, conventional methods of categorizing and presenting products often falter when individual users (e.g., sellers) contribute items to the platform. For example, the individual users provide varied titles and descriptions, which can hinder search result matching to relevant items.

In the context of collectables, catalogs exist as comprehensive lists of a collection of items, such as coins, stamps, or trading cards. Catalogs, for instance, list the distinguishing aspects of a given item that differentiate it from other items in the collection. A collector (e.g., a buyer) may search the online platform for these distinguishing aspects in an attempt to find the item for sale. However, the search may return no results, low results, or irrelevant results, even when the desired item is listed, based on an accuracy and completeness of the product data provided by the seller.

SUMMARY

Catalog-based item listing enhancement is described. A matching item from a collection of items may be selected to match an item listing by at least one of an aspect matching model trained using a catalog of the collection of items and a language model trained using a database of item listings. The item listing may be updated based on an entry for the matching item in the catalog.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
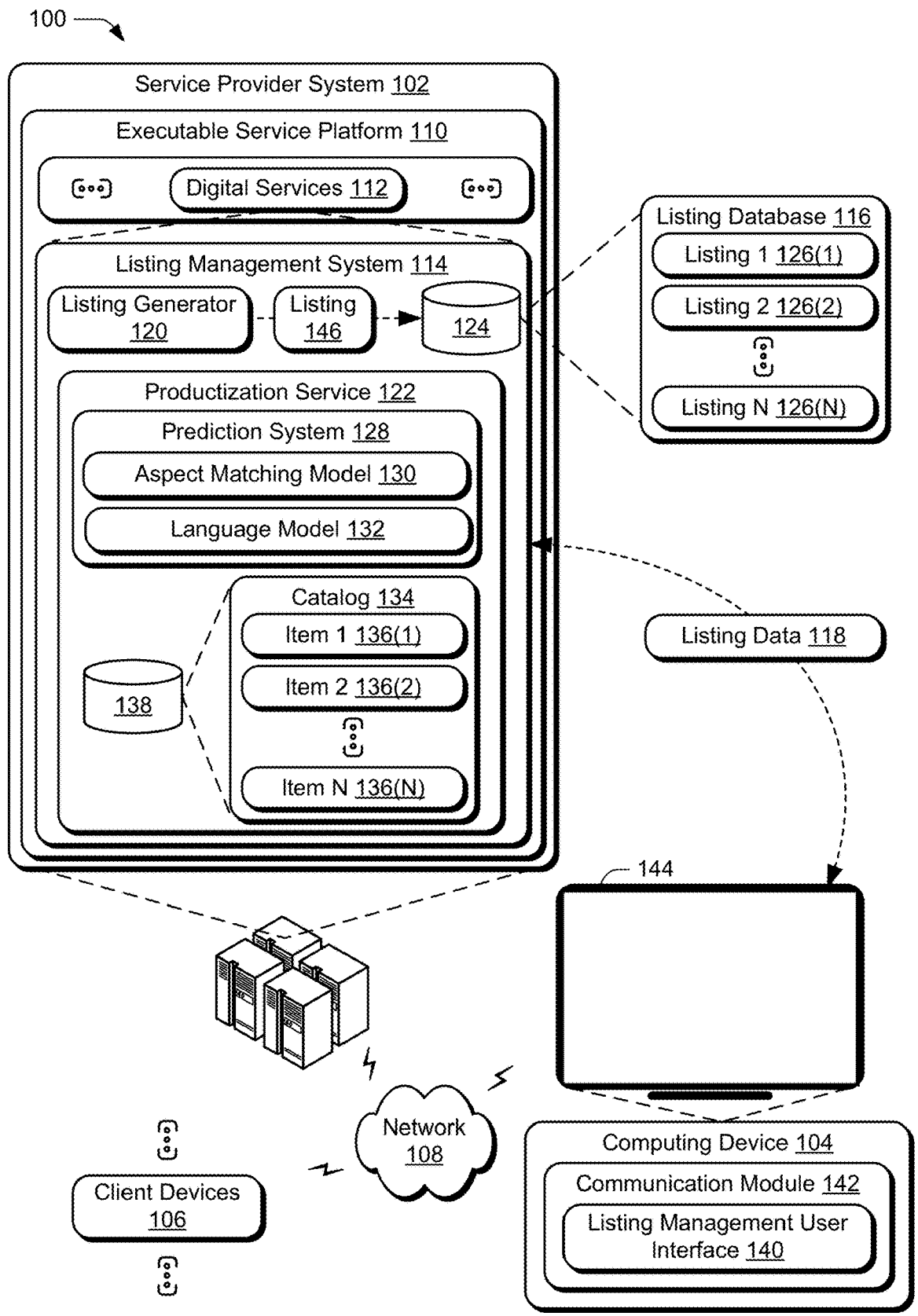
FIG. 1 is an illustration of a digital medium environment in an example implementation that is operable to employ catalog-based item listing enhancement techniques described herein.

Listing quality impacts the usability and effectiveness of an online platform hosting such listings. In general, a "listing" refers to a detailed presentation of an item (e.g., a product or service) that typically includes an item description, specifications (e.g., materials, sizes, colors, or other aspects), pricing, and images. The listing, for instance, is a digital representation of a physical or digital item. However, an accuracy and completeness of the listings varies, particularly when the listings hosted on the online platform are submitted by multiple different users (e.g., sellers, also referred to as listing users). This lack of standardization can make it difficult for the online platform to return relevant item search results. For example, the different users provide varied titles and descriptions, which can hinder search result matching to relevant items. As a result, another user searching for a specific item on the online platform (e.g., a buyer, also referred to as a searching user) may submit repeated queries with varying keywords in an attempt to find the specific item, which increases network traffic and prevents computing resources of the online platform from performing other tasks. This may result in higher response latencies across the online platform as well as higher power usage by a client device used to submit the repeated queries. This also results in user frustration for both a listing user having a listing with poor discoverability on the online platform and for a searching user who struggles to find the listing.

Accordingly, catalog-based item listing enhancement is described. This technique supports computing resource-efficient listing search and retrieval by updating item listings automatically and without user intervention using information from a catalog. The catalog documents a collection of items and includes, for example, item identifiers that are assigned to a specific item in the collection along with a description and/or list of relevant aspects that distinguish the item from other items in the collection with respect to a variety of aspect categories. By way of example, aspect categories for a card from a collectable trading card game include a game to which the card belongs, a card name, a card number, a card set, a finish, a rarity, and the like. Item collections that have been cataloged provide an opportunity for productizing listings without relying on the listing user to provide complete and accurate information in a standardized manner.

In accordance with the techniques described herein, a prediction system uses an aspect matching model to match an item listing to an item of a collection of items included in a catalog. The catalog, for instance, defines the collection of items with respect to a plurality of aspect categories. The aspect matching model is trained based on the catalog, which makes the aspect matching model specific for matching items of the collection of items. For instance, the prediction system includes a plurality of different aspect matching models each trained based on a different catalog describing a different collection of items. Non-limiting examples of techniques utilized by the aspect matching model include token-based matching, semantic matching, rule-based matching, optical character recognition matching, Siamese networks, similarity learning models, and statistical models. Through training, the aspect matching model "learns" which aspect categories of the plurality of aspect categories are usable to distinguish one item of the collection of items from the others, and the aspect matching model evaluates the item listing with respect to these aspect categories in order to match the item listing to the item of the collection of items.

In one or more implementations, in addition to or as an alternative to the aspect matching model, the prediction system uses a language model trained to match the item listing to the item of the collection of items based on similarity measurements. In various scenarios, the language model matches the item listing to the item of the collection of items when the aspect matching model does not identify a match because the language model uses similarity rather than aspect matching. The language model, for instance, is trained and/or fine-tuned using a plurality of listings, e.g., a listing database, and may be configured to calculate a similarity score (e.g., a semantic similarity) between the listing data and respective items of the collection of items based on the catalog. As a part of this, the language model generates listing embeddings from the item listing and item embeddings for individual items of the collection of items and calculates similarity scores for the listing embeddings and the item embeddings for the individual items of the collection of items. In at least one implementation, a highest scoring item of the collection of items is identified as the match. Additionally or alternatively, the match is identified in response to the similarity score of the highest scoring item of the collection being greater than a threshold. As such, in various implementations, no match is identified in response to the similarity score of the highest scoring item being less than the threshold, which may increase an accuracy of the matching.

Once the match is identified, the listing data is updated with corresponding data from the catalog. This includes, for instance, tagging the item listing with an item identifier for the item of the collection as indicated in the catalog (e.g., a unique code or string of alphanumeric characters that enables the associated entry to be identified and referenced in the catalog), generating a description for the item listing based on information in an entry for item in the catalog, and/or updating a title of the item listing. For instance, the language model is further trained to generate a reconstructed listing title based on aspects extracted from the item listing. The reconstructed listing title is standardized with respect to the aspects included as well as an order of the information. In at least one implementation, the item listing is updated to include the reconstructed listing title, which reduces listing-to-listing variability.

In this way, a number of repeated inputs used to obtain a desired search result is reduced, which decreases network traffic and makes computing resources available for performing other tasks, resulting in lower response latencies across the online platform. Additionally, by having to process the reduced number of inputs, less power is used, thereby increasing device battery life and/or enabling the power to be used for alternative tasks. In this way, the catalog-based item listing enhancement described herein improves the operation of a computing device. Further discussion of these and other examples is included in the following discussion and shown in corresponding figures.

In some aspects, the techniques described herein relate to a method for catalog-based item listing enhancement, the method including: selecting a matching item from a collection of items to match an item listing by at least one of an aspect matching model trained using a catalog of the collection of items and a language model trained using a database of item listings; and updating the item listing based on an entry for the matching item in the catalog.

In some aspects, the techniques described herein relate to a method, wherein selecting the matching item from the collection of items to match the item listing by at least one of the aspect matching model trained using the catalog of the collection of items and the language model trained using the database of item listings includes: extracting listing aspects of the item listing; extracting item aspects of individual items of the collection of items based on the catalog; and selecting, by the aspect matching model, the matching item from the collection of items in response to the listing aspects matching the item aspects for a combination of aspect categories learned by the aspect matching model during training.

In some aspects, the techniques described herein relate to a method, wherein selecting the matching item from the collection of items to match the item listing by at least one of the aspect matching model trained using the catalog of the collection of items and the language model trained using the database of item listings further includes: in response to the listing aspects not matching the item aspects for the combination of aspect categories: generating, by the language model, listing embeddings based on the listing aspects and item embeddings for the individual items of the collection of items based on the item aspects; calculating, by the language model, a similarity score between the listing embeddings and the item embeddings for the individual items of the collection of items; and selecting, by the language model, the matching item from the collection of items based on the similarity score.

In some aspects, the techniques described herein relate to a method, wherein the language model is further trained to reconstruct a title for the item listing based on the listing aspects, and the method further includes updating the item listing with the reconstructed title.

In some aspects, the techniques described herein relate to a method, wherein selecting the matching item from the collection of items to match the item listing by at least one of the aspect matching model trained using the catalog of the collection of items and the language model trained using the database of item listings includes: generating, by the language model, listing embeddings for the item listing and item embeddings for individual items of the collection of items; calculating, by the language model, similarity scores for the listing embeddings and the item embeddings for the individual items of the collection of items; and selecting, by the language model, the matching item from the collection of items based on the similarity scores.

In some aspects, the techniques described herein relate to a method, wherein the matching item has a highest similarity score of the collection of items.

In some aspects, the techniques described herein relate to a method, wherein a similarity score of the matching item is greater than threshold score.

In some aspects, the techniques described herein relate to a method, wherein updating the item listing based on the entry for the matching item in the catalog includes updating the item listing with information from the entry automatically and without user intervention.

In some aspects, the techniques described herein relate to a method, further including broadcasting the updated item listing to a client device.

In some aspects, the techniques described herein relate to a computer-readable storage medium storing instructions that, responsive to execution by one or more processors, causes the one or more processors to perform operations including: obtaining a catalog of a collection of items; training an aspect matching model to match an item listing to an item of the collection of items based on the catalog; and updating the item listing based on an entry for the item in the catalog.

In some aspects, the techniques described herein relate to a computer-readable storage medium, wherein the operations further include: obtaining a database of a plurality of listings; training a language model to generate a reconstructed listing title for the item listing based on the plurality of listings; and updating the item listing based on the reconstructed listing title.

In some aspects, the techniques described herein relate to a computer-readable storage medium, wherein the reconstructed listing title includes aspects extracted from the item listing arranged in an order learned by the language model during the training.

In some aspects, the techniques described herein relate to a computer-readable storage medium, wherein the language model is further trained to output a similarity score between the item listing and the item of the collection of items based in part on the reconstructed listing title for the item listing.

In some aspects, the techniques described herein relate to a computer-readable storage medium, wherein training the aspect matching model to match the item listing to the item of the collection of items based on the catalog includes: extracting aspect categories of aspects describing the collection of items in the catalog; generating a plurality of combinations of the aspect categories, individual combinations of the plurality of combinations including a subset of the aspect categories; selecting a combination of aspect categories of the plurality of combinations based on a number of items of the collection of items that are differentiated from other items in the collection of items; and training the aspect matching model using the combination of aspect categories.

In some aspects, the techniques described herein relate to a computer-readable storage medium, wherein updating the item listing based on the entry for the item in the catalog includes tagging the item listing with the entry for the item in the catalog.

In some aspects, the techniques described herein relate to a computer-readable storage medium, wherein updating the item listing based on the entry for the item in the catalog includes updating the item listing with information from the entry.

In some aspects, the techniques described herein relate to a system, including: a prediction system configured to match listing data with an item of a collection of items included in a catalog, the prediction system including an aspect matching model trained based on the catalog and a language model trained based on a database of item listings; and a listing generator configured to generate an item listing based on the listing data and an entry for the item in the catalog.

In some aspects, the techniques described herein relate to a system, wherein to match the listing data with the item of the collection of items included in the catalog, the prediction system is configured to: extract listing aspects from the listing data; extract item aspects for individual items of the collection of items from the catalog; and match, by the aspect matching model, the listing data with the item of the collection of items based on the listing aspects and the item aspects for a combination of aspect categories learned by the aspect matching model during training.

In some aspects, the techniques described herein relate to a system, wherein to match the listing data with the item of the collection of items included in the catalog, the prediction system is configured to: generate, by the language model, listing embeddings based on the listing data and item embeddings for individual items of the collection of items based on the catalog; calculate, by the language model, similarity scores for the listing embeddings and the item embeddings for the individual items of the collection of items; and match, by the language model, the listing data with the item of the collection of items based on the similarity scores.

In some aspects, the techniques described herein relate to a system, wherein to generate the item listing based on the listing data and the entry for the item in the catalog, the listing generator is configured to: retrieve an item identifier from the entry for the item in the catalog; and tag the item listing with the item identifier.

In the following discussion, an example environment is first described that may employ the techniques described herein. Examples of implementation details and procedures are then described which may be performed in the exemplary environment as well as other environments. Performance of the example procedures is not limited to the example environment and the example environment is not limited to performance of the example procedures.

Example of an Environment

FIG. 1 is an illustration of a digital medium environment 100 in an example implementation that is operable to employ catalog-based item listing enhancement techniques described herein. The illustrated environment 100 includes a service provider system 102, a computing device 104, and a plurality of client devices 106 that are communicatively coupled, one to another, via a network 108. Computing devices that implement the service provider system 102, the computing device 104, and the client devices 106 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described with respect to FIG. 8.

The service provider system 102 includes an executable service platform 110. The executable service platform 110 is configured to implement and manage access to digital services 112 "in the cloud" that are accessible by the client devices 106 via the network 108. Thus, the executable service platform 110 provides an underlying infrastructure to manage execution of the digital services 112, e.g., through control of underly computational resources.

The executable service platform 110 supports numerous computational and technical advantages, including an ability of the service provider system 102 to readily scale resources to address wants of an entity associated with the client devices 106. Thus, instead of incurring an expense of purchasing and maintaining proprietary computer equipment for performing specific computational tasks, cloud computing provides the client devices 106 with access to a wide range of hardware and software resources so long as the client has access to the network 108.

The digital services 112 can take a variety of forms. Examples of digital services include social media services, document management services, storage services, media streaming services, content creation services, productivity services, digital marketplace services, auction services, and so forth. In the present example, the digital services 112 include a listing management system 114. In at least one implementation, the listing management system 114 includes functionality for creating, organizing, and managing listings stored in at least one listing database 116 in a manner that enables users and applications to store, retrieve, and edit the listings efficiently and accurately. The listing management system 114 performs listing management tasks, including generating and/or adjusting at least a portion of information included in the listings, according to steps of one or more algorithms and is thus configured as a special-purpose machine. As will be elaborated herein, the listing management system 114 receives listing data 118 (e.g., from a user) for a cataloged item and generates a listing for the cataloged item via a listing generator 120 based on the listing data 118 and additional input received from a productization service 122. The generated listing is then stored in the listing database 116.

By way of example, execution of the listing management system 114 by the executable service platform 110 generates the listing database 116, which is illustrated as being stored in a storage device 124, e.g., a data warehouse of the listing management system 114. The listing database 116 may be generated, for instance, by the listing generator 120 based on the listing data 118 received for individual listings of a plurality of listings. In one or more implementations, individual listings for the plurality of listings are stored as entries in the listing database 116 according to a listing identifier (ID), which includes a unique code or string of characters (e.g., alphanumeric characters) that enables the associated listing to be tracked, organized, and managed. The entries of the listing database 116 are depicted in FIG. 1 as a first listing 126(1) (e.g., "listing 1"), a second listing 126(2) (e.g., "listing 2"), and an $n^{th}$ listing 126(N) (e.g., "listing N"), with ellipses denoting that one or more other listings may exist in the database 116. It is to be appreciated that individual entries in the listing database 116 include different listing IDs. Entries in the listing database 116 may also be retrieved from the storage device 124, for example, in response to a search query submitted to the executable service platform 110.

The entries in the listing database 116 include instances of items that have been registered on the executable service platform 110 (e.g., for sale) in order to make the items available to other users (e.g., for purchase). The listing database 116 includes, for example, active listings of items currently available and accessible via the client devices 106. In at least one implementation, the listing database 116 further includes inactive listings of items that are no longer available and accessible via the client devices 106, such as due to a sale of the item via the listing or an expiration of the listing.

In one or more implementations, the productization service 122 includes a prediction system 128 comprising an aspect matching model 130 and a language model 132, which are used alone or in combination to match a listing of the listing database 116 with an item of a catalog 134. The catalog 134 is a comprehensive database that provides detailed information about a collection of items, such as coins, stamps, trading cards (e.g., sports cards or a cards of a trading card game), limited edition items, designer items (e.g., watches, purses, etc.), comics, toys, figurines, apparel, or the like. The catalog 134 includes information that describes the collection of items according to relevant features, referred to herein as "aspects," in aspect categories that are common to the items in the collection and include defined variations. Examples of aspect categories include size, color, model, designer, year of manufacture, issue, and so forth. Additional examples of aspects are provided herein with respect to FIG. 4.

In one or more implementations, entries for individual items in the collection are stored in the catalog 134 according to an item ID, which includes a unique code or string of characters (e.g., alphanumeric characters) that enables the associated entry to be identified and referenced. The entries of the catalog 134 are depicted in FIG. 1 as a first item 136(1) (e.g., "item 1"), a second item 136(2) (e.g., "item 2"), and an $n^{th}$ item 136(N) (e.g., "item N"), with ellipses denoting that one or more other items may exist in the catalog 134. Similar to the listings of the listing database 116, individual items in the catalog 134 are associated with different item IDs. It is to be appreciated that multiple listings may exist in the listing database 116 for a specific item, such as when multiple instances of the item are listed on the executable service platform 110. In contrast to this, the catalog 134 includes one entry for the specific item.

The catalog 134 is shown as being stored in a storage device 138, e.g., a data warehouse of the productization service 122. Although one catalog 134 is shown, it is to be appreciated that the storage device 138 may store a plurality of catalogs. For instance, respective catalogs of the plurality of catalogs are associated with different collections. By way of example, a first catalog systematically provides information for a first collection of items (e.g., a first trading card game), and a second catalog systematically provides information for a second collection of items (e.g., watches by a specific designer).

Figure 2:
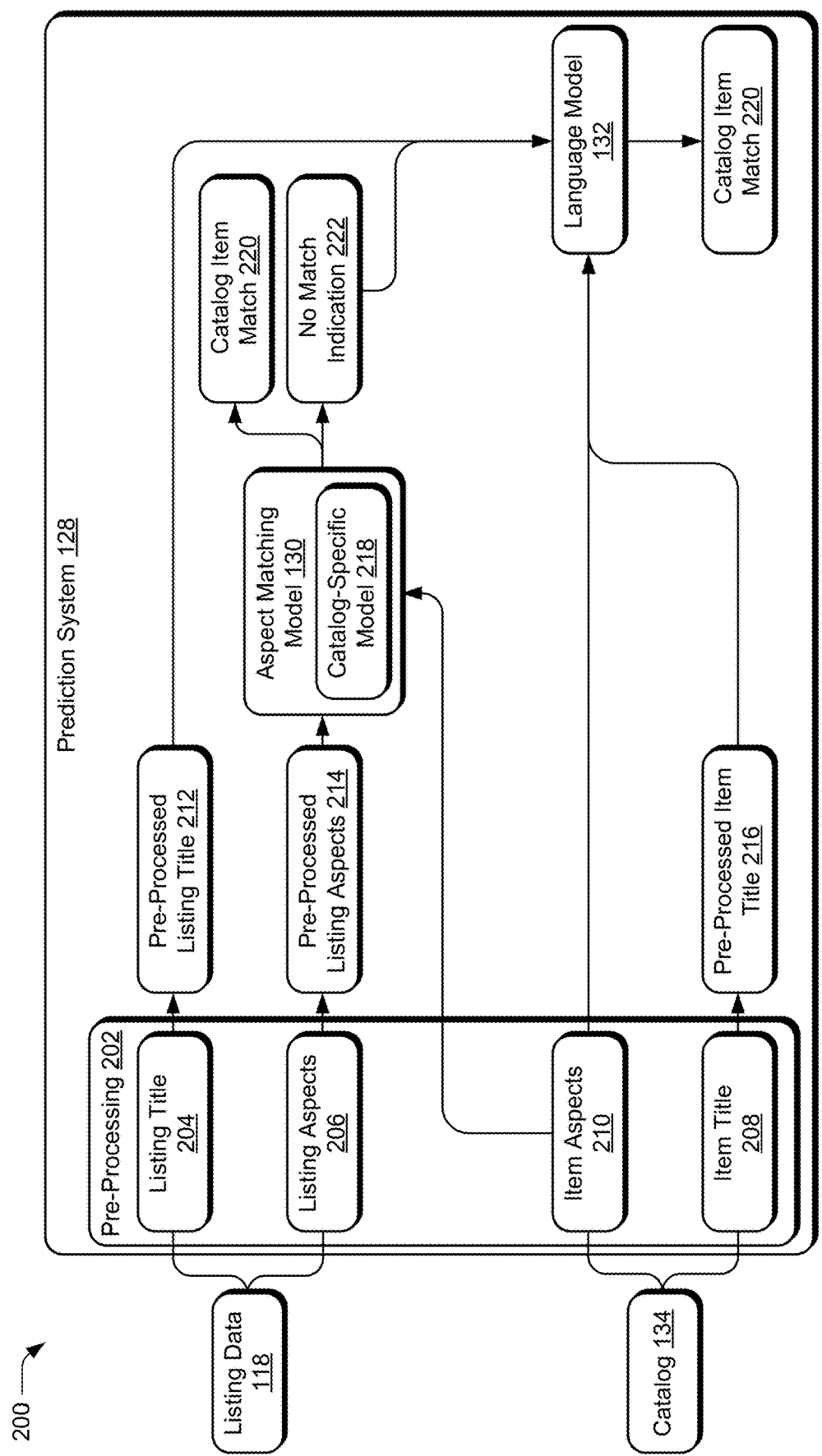
FIG. 2 depicts an example implementation showing operation of the prediction system of the listing management system of FIG. 1 in greater detail.
Figure 3:
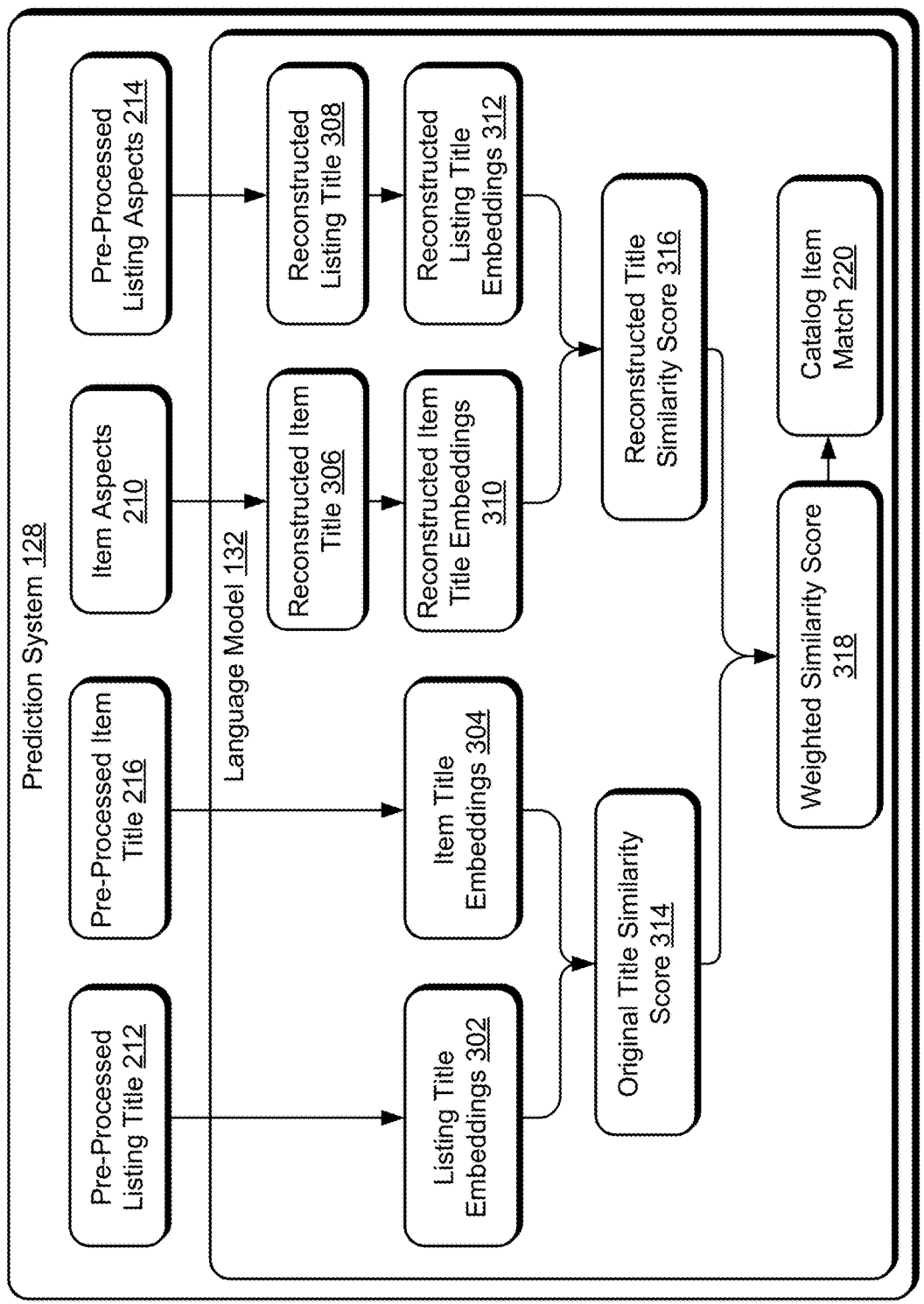
FIG. 3 depicts an example implementation of the language model of the prediction system of FIG. 1 in greater detail.

As will be elaborated herein, e.g., with respect to FIGS. 2 and 3, the prediction system 128 of the productization service 122 includes functionality for matching a listing of the listing database 116 with an item of the catalog 134 in order to tag the listing with the item of the catalog 134. Additionally or alternatively, the prediction system 128 includes functionality for reconstructing at least a portion of the information in the listing based on the matched item in the catalog 134. The prediction system 128 matches the listing of the listing database 116 with the item of the catalog 134 via one or a combination of the aspect matching model 130 and the language model 132. The aspect matching model 130 is trained using the catalog 134 to identify a combination of aspects that are usable to uniquely identify an item in the catalog 134, and the aspect matching model 130 analyzes the listings in the database 116 for this combination of aspects to identify matches between the listings of the listing database 116 and the items of the catalog 134. In at least one implementation, a separate aspect matching model 130 is trained for individual catalogs 134 stored in the storage device 138.

The language model 132 is trained and/or fine-tuned using the listings of the listing database 116 and the catalog 134 to identify matches between a listing and an item described in the catalog 134. By way of example, the language model 132 is large language model (LLM) that is initially trained (e.g., pre-trained) on a large corpus of diverse text data and then further trained (e.g., fine-tuned) using the listing database 116 so that the language model 132 is specialized for listing-specific data. During the fine-tuning, for instance, weights and parameters of the language model 132 are adjusted using training data generated from the listings in the listing database 116 using one or a combination of supervised learning (where target output labels are included in the training data), unsupervised learning (where explicit target output labels are not provided in the training data), self-supervised learning (where the language model 132 generates the target output labels from the training data), and semi-supervised learning (where the training data includes a combination of labeled and unlabeled examples). As such, the language model 132 is at least partially trained based on the listings of the listing database 116. In at least one implementation, the language model 132 matches a title of the listing in the listing database 116 to a title of the item in the catalog 134 using a similarity measurement. Additionally or alternatively, the language model 132 reconstructs the title of the listing to standardize it with the title of the item in the catalog 134 with respect to an order and a type of information included in the title, such as will be elaborated below with respect to FIG. 3. As an illustrative example in relation to trading card games, the reconstructed title of the listing includes "[game title] [card name] [card number] [set] [finish] [rarity]," where information for a given aspect category denoted in brackets is populated based on information in the listing and/or provided in the catalog 134 for the matching item.

In at least one implementation, the listing management system 114 is configured to generate a listing management user interface 140, which is illustrated as accessed by the computing device 104 via the network 108 using a communication module 142, e.g., a browser, a network-enabled application, or the like. The listing management user interface 140, as displayed by a display device 144, is configured to receive inputs that submit the listing data 118 to the listing management system 114 in order to generate a listing 146 (e.g., by the listing generator 120), which is then stored in the listing database 116. For example, a user may manually input or otherwise select the particular information included in the listing data 118. The listing management user interface 140 may include functionality to guide the user through the input of various item description fields, including a title, an item category, a description, and item aspects.

In accordance with the techniques described herein, in response to receiving the listing data 118, the productization service 122 identifies (e.g., selects) a matching item of the catalog 134 via the prediction system 128 and automatically tags the listing 146 with the corresponding item ID of the catalog 134. Tagging the listing 146 with the corresponding item ID causes the information in the catalog 134 to be automatically associated with the listing 146 such that a search query matching the item in the catalog 134 will surface the listing 146. For example, the process of tagging may add searchable metadata that provides additional context to the listing 146. Additionally or alternatively, the productization service 122 causes the listing generator 120 to generate or otherwise update at least a portion of the listing data 118 based on the corresponding item in the catalog 134. The listing 146, including the adjusted listing data 118, may be broadcast for display via the listing management user interface 140 and the display device 144.

By matching the listing 146 to an item in the catalog 134 via the prediction system 128 of the productization service 122, more accurate and relevant search results are returned for a given query, resulting in fewer repeated searches and fewer user inputs, which reduces a burden on computing resources and thus improves the operation of the service provider system 102. In this way, an operating efficiency of the service provider system 102 is increased. Moreover, a user experience is enhanced for both listing users (e.g., sellers) and searching users (e.g., buyers) of the service provider system 102. For instance, power consumption by the client devices 106 is decreased by reducing repeated user inputs, which thus improves the operation of the client devices 106.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

FIG. 2 depicts an example implementation 200 showing operation of the prediction system 128 of the listing management system 114 of FIG. 1 in greater detail. The following discussion describes techniques that are implementable utilizing the previously described systems and devices, and thus, where applicable, reference will be made to components previously introduced in FIG. 1.

In the example implementation 200, the prediction system 128 receives the listing data 118 and the catalog 134 and performs pre-processing 202 to extract relevant data and transform the data into a usable format for downstream operations. By way of example, the pre-processing 202 includes extracting a listing title 204 and listing aspects 206 from the listing data 118 and extracting an item title 208 and item aspects 210 from the catalog 134 (e.g., cataloged aspects for a corresponding item). The listing aspects 206 are item aspects that are provided in the listing data 118. For instance, the listing aspects 206 specify relevant features that define the item described by the listing and enable it to be distinguished from other similar items, such as size, color, year of manufacture, brand, designer, rarity, condition, finish, and so forth. In this context, "extracting" refers to retrieving specific information from a larger dataset or text entry in order to identify and isolate relevant attributes. In one or more implementations, the prediction system 128 includes text analysis functionality for identifying and extracting the listing title 204, the listing aspects 206, the item title 208, and/or item aspects 210, such as based on their respective positions within specific fields in the corresponding data and/or via text recognition and natural language processing techniques. Additionally or alternatively, the prediction system 128 is trained using supervised learning techniques with labeled training data to teach the prediction system 128 to identify specific components of the corresponding data. In at least one variation, the prediction system 128 is trained to identify patterns or themes in the corresponding data without labeled training data. It is to be appreciated that the item title 208 and the item aspects 210 may be extracted for every item in the catalog 134, at least in some implementations.

In one or more implementations, the pre-processing 202 further includes text cleaning, tokenization, and/or stopword removal. Text cleaning, for instance, includes removing irrelevant characters, symbols, and formatting issues from text data in order to standardize the text data. Tokenization includes breaking down the text data into smaller units called tokens, e.g., words or phrases. Tokenization aids natural language processing tasks by transforming continuous text into a format that can be more easily processed. Stopwords are common words that often do not contribute meaning to the text data (e.g., "the," "and," "is," "in," and "of") and are thus removed to reduce noise and improve the efficiency of downstream operations. Additionally or alternatively, the pre-processing 202 includes duplication removal.

In the illustrated example, the pre-processing 202 results in a pre-processed listing title 212, pre-processed listing aspects 214, and a pre-processed item title 216. By way of example, the pre-processed listing title 212 is the listing title 204 following the text cleaning, stopword removal, and tokenization. In one or more implementations, the item aspects 210 undergo less pre-processing than the listing aspects 206 due to the fact that information is standardized in the catalog 134 whereas the listing data 118 is user-generated information.

The pre-processed listing aspects 214 and the item aspects 210 are input into the aspect matching model 130, which is or includes a catalog-specific model 218. The catalog-specific model 218, for instance, is generated based on the catalog 134, such as will be elaborated below with respect to FIG. 4. The catalog-specific model 218 is configured to compare the pre-processed listing aspects 214 with the item aspects 210 for a combination of aspect categories that is specific to the catalog 134 in order to identify a catalog item match 220 for the listing data 118. Non-limiting examples of one or more algorithms and/or models implemented by the catalog-specific model 218 as a part of the aspect matching model 130 include token-based matching, Siamese networks, similarity learning models, semantic matching, rule-based matching, optical character recognition matching, and statistical models. In at least one implementation, the catalog-specific model 218 filters the pre-processed listing aspects 214 and the item aspects 210 to the combination of aspect categories that is specific to the catalog 134 prior to performing a matching operation.

When a match is identified, e.g., the item aspects 210 extracted from an item entry in the catalog 134 are matched to the pre-processed listing aspects 214 extracted from the listing data 118, the match is output as the catalog item match 220. For instance, a match occurs when there are no semantic differences between the pre-processed listing aspects 214 and the item aspects 210 of the catalog item match 220, e.g., for all of the filtered item aspects. In one or more implementations, the listing data 118 is tagged with the catalog item match 220, which enhances the information provided in the listing data 118. In contrast, a match does not occur when at least one of the pre-processed listing aspects 214 is different from the item aspects 210 for every item in the catalog 134. When a match is not identified, a no match indication 222 is output. The no match indication 222 indicates that the aspect matching model 130 was not able to identify a corresponding item in the catalog 134 based on the pre-processed listing aspects 214.

In at least one implementation, in response to the no match indication 222 being output, an additional match attempt is performed using the language model 132. In at least one variation, the language model 132 is employed even when the catalog item match 220 is identified in order to confirm the catalog item match 220. In one or more implementations, the language model 132 performs similarity measurements and weighting to identify the catalog item match 220. Additional details regarding the language model 132 are described below with respect to FIG. 3.

Referring now to FIG. 3, an example implementation 300 of the language model 132 of the prediction system 128 is shown in greater detail. In the depicted example implementation 300, the language model 132 is a transformer-based model, such as a bidirectional encoder representations from transformers (BERT) model or a generative pre-trained transformer (GPT) model. It is to be appreciated that in variations, the language model 132 is not a transformer-based model. By way of example, the language model 132 is or includes one or more of a non-transformer attentional model, a memory network, a hierarchical model, and/or another type of neural network.

In the depicted implementation 300, the language model 132 generates listing title embeddings 302 from the pre-processed listing title 212 and generates item title embeddings 304 from the pre-processed item title 216. An "embedding" refers to a vector representation of the words or tokens of the input text. The language model 132 also performs aspect-based title reconstruction. A reconstructed item title 306 is generated from the item aspects 210, and a reconstructed listing title 308 is generated from the pre-processed listing aspects 214. For example, at least a portion of the pre-processed listing aspects 214 are arranged in a text string in a pre-determined order that generates a descriptive title. As an illustrative example in relation to trading card games, the text string includes "[game title] [card name] [card number] [set] [finish] [rarity]," where information for a given aspect category denoted in brackets is populated based on the pre-processed listing aspects 214 or the item aspects 210 for the reconstructed listing title 308 and the reconstructed item title 306, respectively. As such, the title reconstruction standardizes the order and type of information provided in the reconstructed listing title 308 and the reconstructed item title 306 with respect to each other.

The language model 132 generates reconstructed item title embeddings 310 from the reconstructed item title 306 and reconstructed listing title embeddings 312 from the reconstructed listing title 308. As such, the language model 132 generates the title embeddings 302 based on the original pre-processed listing title 212 and the reconstructed listing title embeddings 312 based on the reconstructed listing title 308 in order to perform two similarity comparisons with data derived from the catalog 134 (e.g., the item title embeddings 304 and the reconstructed item title embeddings 310). Although not explicitly depicted in FIG. 3, the language model 132 is trained to generate the reconstructed titles and embeddings using the listing database 116.

The language model 132 generates an original title similarity score 314 by comparing the title embeddings 302 and the item title embeddings 304. By way of example, generating the original title similarity score 314 includes calculating a cosine similarity between the title embeddings 302 and the item title embeddings 304. The cosine similarity calculation enables the semantic similarity of the pre-processed listing title 212 and the pre-processed item title 216 to be compared. Similarly, the language model 132 generates a reconstructed title similarity score 316 by comparing the reconstructed item title embeddings 310 and the reconstructed listing title embeddings 312, e.g., via a second cosine similarity calculation.

In at least one implementation, the language model 132 combines the original title similarity score 314 and the reconstructed title similarity score 316 by calculating a weighted similarity score 318. For example, more or less weight is given to the original title similarity score 314 relative to the reconstructed title similarity score 316 in calculating the weighted similarity score 318. In one or more implementations, the weights are adjusted during a training process of the language model 132 based on an accuracy of output match results. Additionally or alternatively, the weights are adjusted post-training by the prediction system 128 based on feedback received regarding accuracy of the catalog item match 220, user interaction data for listings matched and tagged via the productization service 122, or other feedback sources.

The language model 132 outputs the catalog item match 220 by comparing the weighted similarity scores calculated for a plurality of items of the catalog 134 (e.g., all of the items of the catalog 134). In at least one implementation, the catalog item match 220 is the item of the catalog 134 that has the highest weighted similarity score 318. Additionally or alternatively, the catalog item match 220 is not identified in response to the weighted similarity score 318 being less than a threshold. For instance, when none of the weighted similarity scores for the items in the catalog 134 are greater than the threshold, the information the listing data 118 cannot be matched to an item in the catalog 134 with high confidence. As such, by using the threshold, tagging the listing 146 with an irrelevant item is avoided.

In this way, the prediction system 128 provides a hybrid architecture for catalog-based item listing enhancement, which increases a catalog coverage and matching accuracy. In at least one implementation, when the catalog item identified by the language model 132 is different than that identified by the aspect matching model 130, the catalog item identified by the aspect matching model 130 is selected as the catalog item match 220 because the aspect matching model 130 uses direct matching whereas the language model 132 uses similarity.

Figure 4:
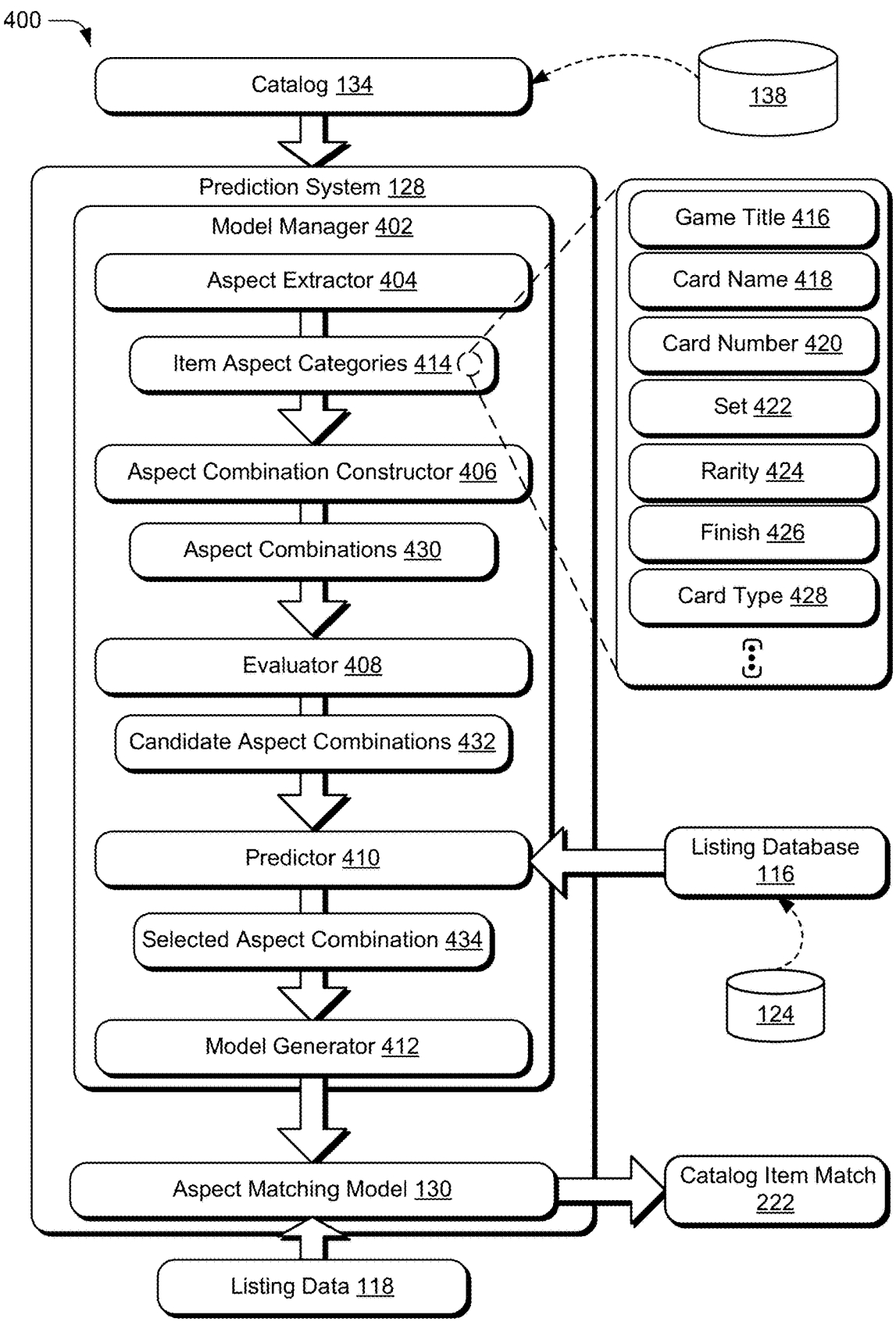
FIG. 4 depicts an example of an implementation for selecting aspects for training and using the aspect matching model for catalog-based item listing enhancement.

FIG. 4 depicts an example of an implementation 400 for selecting aspects for training and using the aspect matching model 130 for catalog-based item listing enhancement. The implementation 400 includes a model manager 402 that is configured to, among other tasks, evaluate and select combinations of item aspect categories that are robust for accurately matching a listing (e.g., the listing 146 shown in FIG. 1) to an item of the catalog 134. The model manager 402 is depicted including a plurality of modules, including an aspect category extractor 404, a combination constructor 406, an evaluator 408, a predictor 410, and a model generator 412. A "module" includes a hardware and/or software system that operates to perform one or more functions, such as the functions that will be described below. For example, a module may include or may be included in a computer processor, a controller, or another logic-based device that performs operations based on instructions stored on a tangible and non-transitory computer-readable storage medium, such as a computer memory. Alternatively, a module may include a hard-wired device that performs operations based on hard-wired logic of the device. The various modules shown in the attached figures, including FIG. 4, may represent the hardware that operates based on software or hard-wired instructions, the software that directs hardware to perform the operations, or a combination thereof. The hardware may include electronic circuits that include and/or are connected to one or more logic-based devices, such as microprocessors, processors, controllers, and the like, as will be elaborated with respect to FIG. 8. It is to be appreciated that the model manager 402 may include more, fewer, or different modules than those illustrated in FIG. 4 without departing from the scope of the present disclosure.

Although the implementation 400 will be described with respect to a trading card game as an illustrative example, the implementation 400 is adaptable for a variety of different categories of cataloged items, such as other collectables, toys, apparel, car parts, appliance parts, and so forth.

Broadly speaking, the model manager 402 is configured to manage machine learning models and algorithms of the prediction system 128, including the aspect matching model 130 and other aspect matching models that are specific to other catalogs. This model management includes, for example, building the aspect matching model 130, training the aspect matching model 130, updating the aspect matching model 130, and so forth. Specifically, the model manager 402 is configured to carry out this model management using, at least in part, the wealth of data maintained in the storage device 124 and the storage device 138. The model manager 402 may utilize one or more machine learning models, including different types of machine learning models where the underlying models are learned using different approaches, such as using supervised learning, unsupervised learning, and/or reinforcement learning. By way of example, these models may include regression models (e.g., linear, polynomial, and/or logistic regression models), classifiers, neural networks, and reinforcement learning-based models, to name just a few.

In the illustrated implementation 400, the model manager 402 is shown obtaining the catalog 134, e.g., from the storage device 138, which is input into the aspect category extractor 404. In general, the aspect category extractor 404 is configured to extract item aspect categories 414 defining shared attributes of the items in the catalog 134 that are used to describe the items in the catalog 134. By way of example, individual entries in the catalog 134 include aspect descriptions of the corresponding item with respect to the item aspect categories 414.

In the illustrated example implementation 400, the item aspect categories 414 include a game title 416 (e.g., a game to which the items in the catalog 134 belong), a card name 418, a card number 420, a set 422, a rarity 424, a finish 426, and a card type 428. The set 422, for instance, is an identifier for a group of cards released together as part of a specific theme, release cycle, or game expansion. The rarity 424 refers to a relative scarcity of the card relative to other cards in the set or collection as a whole, such as common, uncommon, rare, or legendary. The finish 426 refers to a surface treatment or coating applied to the card, such as foil, etched, matte, or glossy. The card type 428 refers to an attribute of the game represented by the card, such as a creature, an artifact, a location, a spell, and so forth. It is to be appreciated that the item aspect categories 414 may vary from the combination illustrated without departing from the spirit or scope of the described techniques. For instance, the item aspect categories 414 additionally or alternatively include a card illustrator, a game stage, a playing cost, a card ability, health or hit points of a creature associated with the card, and so forth.

In one or more implementations the aspect category extractor 404 identifies and extracts the item aspect categories 414 based on their positions within specific fields in the catalog 134. Additionally or alternatively, the aspect category extractor 404 identifies the item aspect categories 414 using text recognition and natural language understanding techniques. In at least one variation, however, the item aspect categories 414 are received by the model manager 402 based on user input, such as when a user manually inputs or otherwise selects the item aspect categories 414.

Information provided for a given aspect category of the item aspect categories 414 may be the same for a plurality of items in the catalog 134. For instance, the game title 416 may be the same for many or all of the items in the catalog 134, while a subset of the items may share a same set, rarity, finish, card type, and so forth. Therefore, in this scenario, the game title 416 may not appreciably differentiate one item in the catalog 134 from another. Individual items include a unique combination of information provided with respect to the item aspect categories 414, and this unique combination distinguishes the item from other items in the catalog 134. However, using every category of the item aspect categories 414 to match the listing data 118 with an item in the catalog 134 may be computing resource intensive. Moreover, the listing data 118 may not include information for at least a portion of the item aspect categories 414. Therefore, in accordance with the techniques described herein, a subset of the item aspect categories 414 that uniquely distinguishes the items in the catalog 134 from each other is identified by the model manager 402, e.g., via the combination constructor 406, the evaluator 408, and the predictor 410.

In the illustrated implementation 400, the combination constructor 406 is depicted receiving the item aspect categories 414. The combination constructor 406 generates different permutations of combinations of the item aspect categories 414, which are output as aspect category combinations 430. The aspect category combinations 430, for instance, include at least two of the item aspect categories 414. The aspect category combinations 430 vary based on a number of item aspect categories included in the subset as well as the particular item aspect included. As an illustrative example, a first aspect combination includes the card name 418, the set 422, and the rarity 424; a second aspect combination includes the finish 426, the card name 418, the card type 428, and the card number 420; a third aspect combination includes the game title 416, the card name 418, and the card type 428; and so forth.

The evaluator 408 is configured to identify candidate combinations 432 from the aspect category combinations 430 based on an ability of a given aspect category combination to distinguish items in the catalog 134 from each other. For example, the aspect category combinations 430 are scored based on a percentage or proportion of items in the catalog 134 that can be uniquely identified using a given aspect category combination, as determined via the evaluator 408. In this scenario, higher scoring aspect category combinations are those that better differentiate the items in the catalog 134 from each other (e.g., the percentage or proportion of items that can be uniquely identified using the aspect category combination is higher). In at least one implementation, the candidate combinations 432 include aspect category combinations that score above an adjustable threshold value.

In at least one implementation, the evaluator 408 evaluates the catalog 134 with respect to the aspect category combinations 430 by retrieving the information specified by a given aspect category combination for an item in the catalog 134 and identifying whether the information is at least partially different than that retrieved for the other items of the catalog 134. As an illustrative example, a first item and a second item share the same card number, the same card name, and the same rarity but have different finishes. Continuing with the present illustrative example, a first aspect combination includes the card number 420, the rarity 424, and the finish 426, and a second aspect combination includes the card name 418, the card number 420, and the rarity 424. As such, the first aspect combination distinguishes the first item and the second item from each other, but the second aspect combination does not.

The predictor 410 is configured to receive the candidate combinations 432 and verify a usefulness of the corresponding aspect category combination for matching with item listings using real-world data, e.g., listings of the listing database 116. For instance, a high scoring candidate combination may accurately distinguish items in the catalog 134 from each other but may fall short with real-world data due to the inconsistent amount and quality of information provided by users in generating the listings. If a significant percentage of the listings in the listing database 116 for items in the catalog 134 are missing information regarding one or more of the item aspect categories 414, then even if those item aspect categories 414 are useful for distinguishing the items in the catalog 134 from each other, a match rate may be relatively low. As such, in at least one implementation, the model manager 402 takes into account user behavior, e.g., via the predictor 410.

The predictor 410 is configured determine match scores for the candidate combinations 432, e.g., based on a relative percentage or proportion of the listings in the listing database 116 that are matched to an item in the catalog 134 using a given candidate combination relative to the other candidate combinations. In one or more implementations, the candidate aspect combination having the highest match score is output by the predictor 410 as a selected aspect category combination 434. The selected aspect category combination 434 is predicted, e.g., by the evaluator 408 and the predictor 410, to have a highest match rate for item listing and catalog matching in a real-world scenario.

In one or more implementations, the selected aspect category combination 434 includes more than one of the candidate combinations 432, such as three of the candidate combinations 432 that have the highest matching score, thus providing multiple options for identifying a match between the listing and the catalog item. By including more than one of the candidate combinations 432 in the selected aspect category combination 434, a match rate and accuracy is increased.

The selected aspect category combination 434 is used by the model generator 412 to generate the aspect matching model 130. By way of example, the model generator 412 trains a pre-generated, generic aspect matching model using the selected aspect category combination 434 in order to make the aspect matching model 130 specific for the catalog 134. As such, the aspect matching model 130 may be generated efficiently and with a reduced burden on computing resources of the prediction system 128.

Example Procedures

This section describes examples of procedures for catalog-based item listing enhancement. Aspects of the procedures may be implemented in hardware, firmware, software, or a combination thereof. The procedures are shown as a set of blocks that specify operations performed by one or more devices and are not necessarily limited to the orders shown for performing the operations by the respective blocks.

Figure 5:
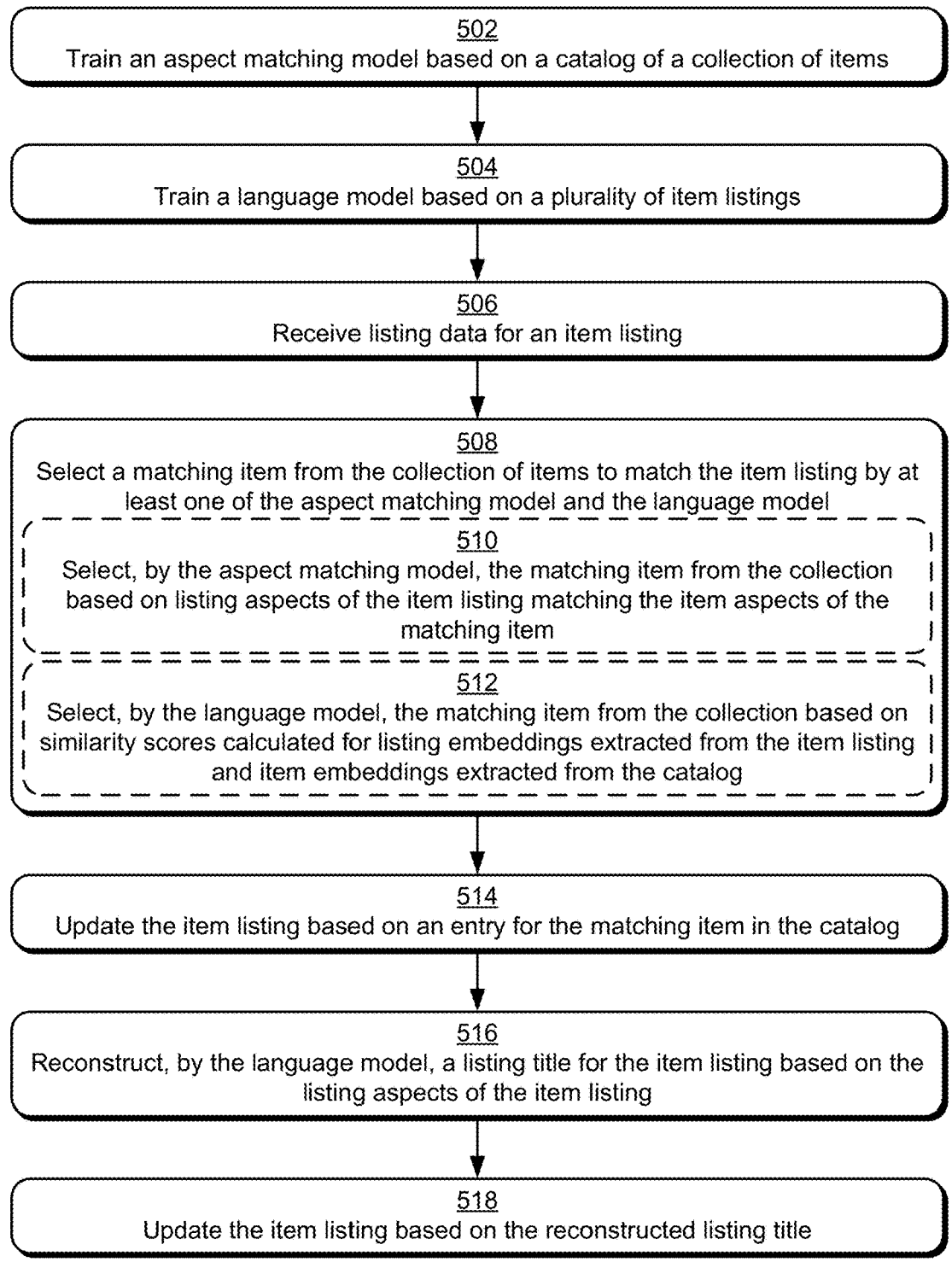
FIG. 5 is a flow diagram depicting an algorithm as a step-by-step procedure in an example of implementing catalog-based item listing enhancement.

FIG. 5 is a flow diagram depicting an algorithm as a step-by-step procedure 500 in an example of implementing catalog-based item listing enhancement. In at least one implementation, the procedure 500 is performable the listing management system 114 as a part of the service provider system 102.

An aspect matching model is trained based on a catalog of a collection of items (block 502). By way of example, training the aspect matching model includes identifying a combination of aspect categories that is usable to uniquely distinguish one item of the collection from other items of the collection, such as described above with respect to FIG. 4. This includes, for instance, generating a plurality of combinations of aspect categories that each include a different subset of the aspect categories used in the catalog to describe the collection of items, and evaluating the plurality of combinations based on information retrieved from the catalog. In one or more implementations, a given aspect category combination is scored based on a number of items of the catalog 134 that include at least partially different information for those aspect categories, and a highest scoring one or more aspect combinations is selected as the identified combination of aspect categories.

A language model is trained based on a plurality of item listings (block 504). By way of example, the language model is a pre-trained model that is further trained and/or fine-tuned using the listing database 116, which includes listing data for a vast quantity of active and inactive item listings. By training the language model with the listing database 116, the language model "learns" how to interpret listing text.

Listing data is received for an item listing (block 506). By way of example, the listing data is received from a user by way of a listing management user interface 140 and a communication module 142. Because the listing data is received from the user, the listing data is not standardized for the type of information included, including its content, completeness, or accuracy.

A matching item from the collection of items is selected to match the item listing by at least one of the aspect matching model and the language model (block 508). By way of example, the matching item is an item of the collection of items that is determined, by the prediction system 128, to be the same as an item described by the listing data. As a part of identifying the matching item, the prediction system 128 may perform pre-processing 202 to extract relevant data from both of the listing data 118 and the catalog 134 and transform the data into a usable format for downstream operations performed by the aspect matching model 130 and/or the language model 132. The pre-processing 202 includes, for instance, extracting a listing title 204 and listing aspects 206 from the listing data 118 and extracting an item title 208 and item aspects 210 from the catalog 134 (e.g., for individual items in the collection described by the catalog). In one or more implementations, the prediction system 128 includes text analysis functionality for identifying and extracting the listing title 204, the listing aspects 206, the item title 208, and/or the item aspects 210, such as based on their respective positions within specific fields in the corresponding data and/or via text recognition and natural language processing techniques. In one or more implementations, the pre-processing 202 further includes text cleaning, tokenization, and/or stopword removal.

In accordance with the described techniques, in at least one implementation, the aspect matching model selects the matching item from the collection based on listing aspects of the item listing matching item aspects of the matching item (block 510). By way of example, the aspect matching model evaluates the listing aspects 206 and the item aspects 210 to determine if there is a match between the listing aspects 206 and the item aspects 210 for one of the items of the collection with respect to the combination of aspect categories that is specific to the catalog 134. In response to the listing aspects 206 matching the item aspects 210, the corresponding item is output as the catalog item match 220 (e.g., the matching item). Additional details regarding a procedure for identifying the item of the collection via the aspect matching model are discussed below with respect to FIG. 6.

Additionally or alternatively, the language model selects the matching item from the collection based on similarity scores calculated for listing embeddings extracted from the item listing and item embeddings extracted from the catalog (block 512). By way of example, the language model calculates at least one similarity score for the listing embeddings and the item embeddings for individual items in the collection of items to identify an item of the collection of items that has a highest similarity score. As elaborated further herein with respect to FIGS. 3 and 7, the item is output as the catalog item match 220 in response to the highest similarity score being greater than a threshold.

The item listing is updated based on an entry for the matching item in the catalog (block 514). By way of example, when the catalog item match 220 is identified, the item listing is tagged with the catalog item match 220 such that the item listing is associated with information from the catalog 134 for the catalog item match 220. Additionally or alternatively, the listing generator 120 updates information in the item listing with information retrieved from the entry for the matching item in the catalog 134. In one or more implementations, the item listing is updated by the listing generator 120 of the listing management system 114 automatically and without user intervention. In at least one variation, the user verifies the updated listing, e.g., via the listing management user interface 140. By updating the item listing based on the entry for the matching item in the catalog, a likelihood that the item listing is returned in response to a relevant search query is increased, which reduces an occurrence of repeated unproductive searching. As a result of reducing repeated unproductive searching, a burden on computing resources of the service provider system 102 as well as a client device used to submit search inputs is reduced. Moreover, power consumption by the client device for performing the searching is reduced, which saves battery life.

A listing title for the item is reconstructed by the language model based on the listing aspects of the item listing (block 516). By way of example, at least a portion of the listing aspects extracted from the item listing are arranged in a pre-determined order that generates a text string. Additionally or alternatively, when the matching item is identified, item aspects from the catalog 134 that are not present in the listing data received from the user are used to supplement the listing aspects 206 in generating the reconstructed listing title.

The item listing is updated based on the reconstructed listing title (block 518). By way of example, the listing generator 120 further updates the item listing by replacing and/or adjusting a title of the item listing with the reconstructed listing title. The reconstructed listing title enables standardization of the type and order of information included in the listing title without relying on a user to input the information in the pre-determined order. By updating the item listing with the reconstructed listing title, listing-to-listing title variations for a specific type of item are reduced, enabling more cohesive productization on the service provider system 102.

Figure 6:
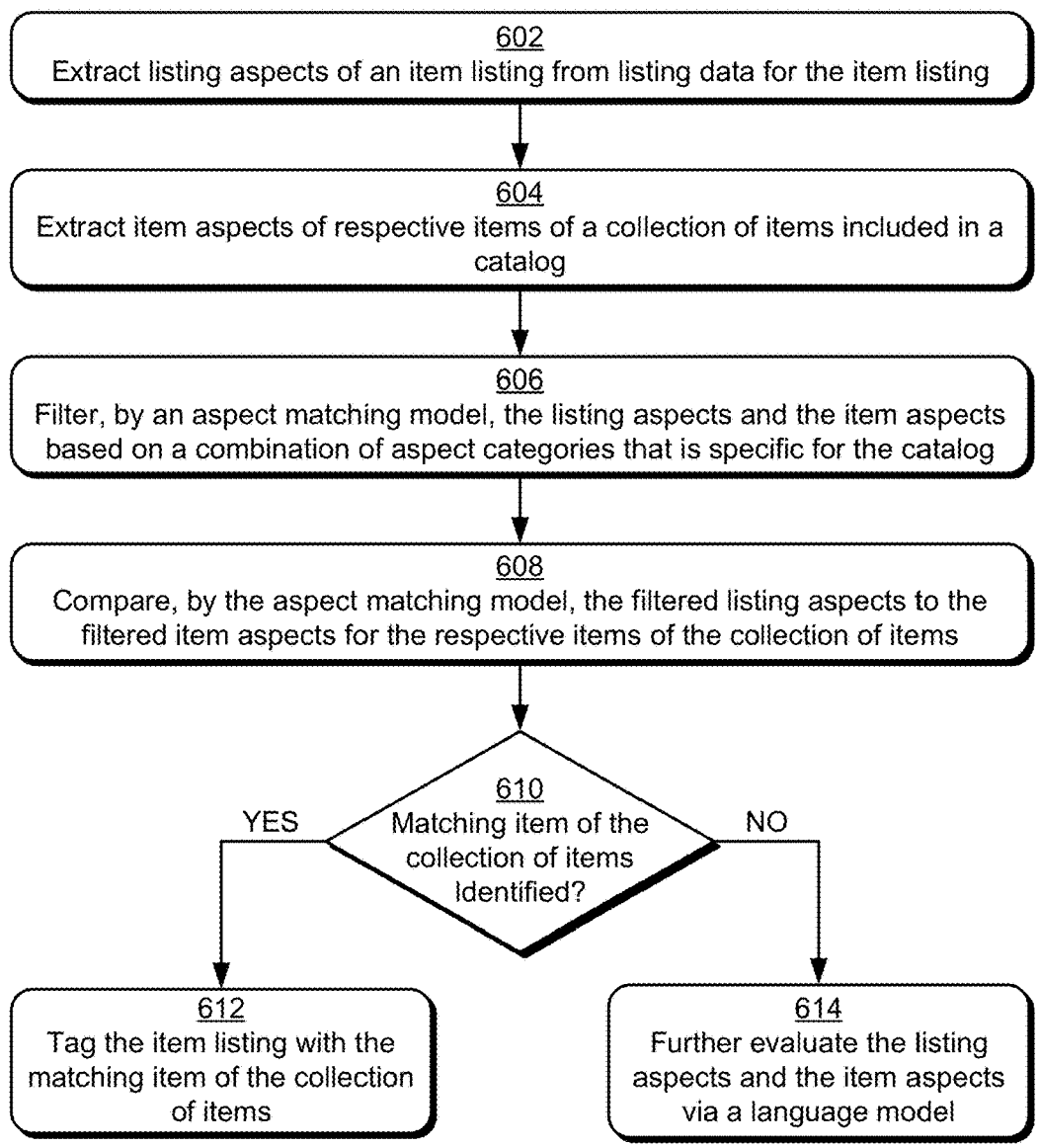
FIG. 6 is a flow diagram depicting an algorithm as a step-by-step procedure in an example of implementing catalog-based item listing enhancement using an aspect matching model.

FIG. 6 is a flow diagram depicting an algorithm as a step-by-step procedure 600 in an example of implementing catalog-based item listing enhancement using an aspect matching model. In at least one implementation, the procedure 600 is performable by the listing management system 114. Moreover, the procedure 600 may be performed as a part of the procedure 500 of FIG. 5, e.g., at block 510. Alternatively, the procedure 600 may be performed independently from the procedure 500.

Listing aspects of an item listing are extracted from listing data for the item listing (block 602). By way of example, the listing aspects 206 are extracted from the listing data 118 by the prediction system 128 based on functionality of the prediction system 128 to identify and isolate relevant attributes of the listing data 118. In one or more implementations, the prediction system 128 includes text analysis functionality for identifying and extracting the listing aspects 206 based on their respective positions within specific fields in the listing data 118 and/or via text recognition and natural language processing techniques. Additionally or alternatively, the prediction system 128 is trained using supervised learning techniques with labeled training data teach the prediction system 128 to identify specific components of the listing data 118. In at least one variation, the prediction system 128 is trained to identify patterns or themes in the listing data 118 without labeled training data.

Item aspects are extracted for respective items of a collection of items included in a catalog (block 604). By way of example, the item aspects 210 are extracted from entries in the catalog 134 for the respective items of the collection, e.g., for every item of the collection. The item aspects 210 may be extracted by the prediction system 128 in a similar manner to that described above with respect to the listing aspects 206.

The listing aspects and the item aspects are filtered by an aspect matching model based on a combination of aspect categories that is specific for the catalog (block 606). By way of example, the aspect matching model is generated using one or more combinations of aspect categories that have been identified to distinguish individual items in the collection from each other, such as described above with respect to FIGS. 4 and 5. As such, in at least one implementation, the aspect matching model filters the listing aspects 206 and the item aspects 210 so that aspects not included in the one or more combinations of aspect categories are not considered. As an illustrative example where the combination of aspect categories includes card name, card finish, and set, information regarding a game title, a card number, and a card rarity is discarded (e.g., filtered out) by the filtering. The filtering enables the aspect matching model to compare the listing aspects 206 and the item aspects 210 with increased efficiency and a reduced burden on computing resources, for example.

The filtered listing aspects are compared, by the aspect matching model, to the filtered item aspects for the respective items of the collection of items (block 608). By way of example, for a given aspect, the aspect matching model performs a direct comparison of the filtered listing aspect with the corresponding filtered listing aspect to determine whether or not the information matches within a pre-defined tolerance. Continuing with the above illustrative example, "holographic foil" for the card finish may match with "holographic foil," "holo," "holographic," or "foil" but may not match with "matte," "glossy," or "standard." A "match" in this context thus refers to the information of the item listing for a specified aspect category being the same as, or having a same meaning as, the information of an item in the catalog for that specified aspect category for an item in the catalog.

It is determined if there is a matching item of the collection of items for the item listing (block 610). By way of example, an item of the collection of items matches the item listing in response to the filtered item aspects matching the filtered listing aspects, e.g., for all of the filtered item aspects. In contrast, the item of the collection of items does not match the item listing in response to at least one of the filtered item aspects being different from the filtered listing aspects.

Responsive to the matching item being identified, the item listing is tagged with the matching item of the collection of items (block 612). By way of example, tagging the item listing with the matching item of the collection causes the information in the catalog 134 for the matching item to be automatically associated with the item listing without a user manually entering such information. For example, the process of tagging may add searchable metadata that provides additional context to the item listing. Additionally or alternatively, at least a portion of the item listing is updated or generated based on the information in the catalog 134 for the matching item. The item listing, including the updated information, may be broadcast to at least one of the client devices 106. For instance, broadcasting the updated item listing to the client device may cause the client device to display the updated listing (e.g., the listing 146) via the listing management user interface 140 and the display device 144.

Responsive to the matching item not being identified, the listing aspects and the item aspects are further evaluated via a language model (block 614). By way of example, the matching item may not be identified when the listing data is incorrect or incomplete with respect to the combination of aspect categories that is specific for the catalog. As such, the language model may be used to detect similarities between the listing aspects and the item aspects that enables the matching item to be found, such as elaborated with respect to FIGS. 3 and 7.

Figure 7:
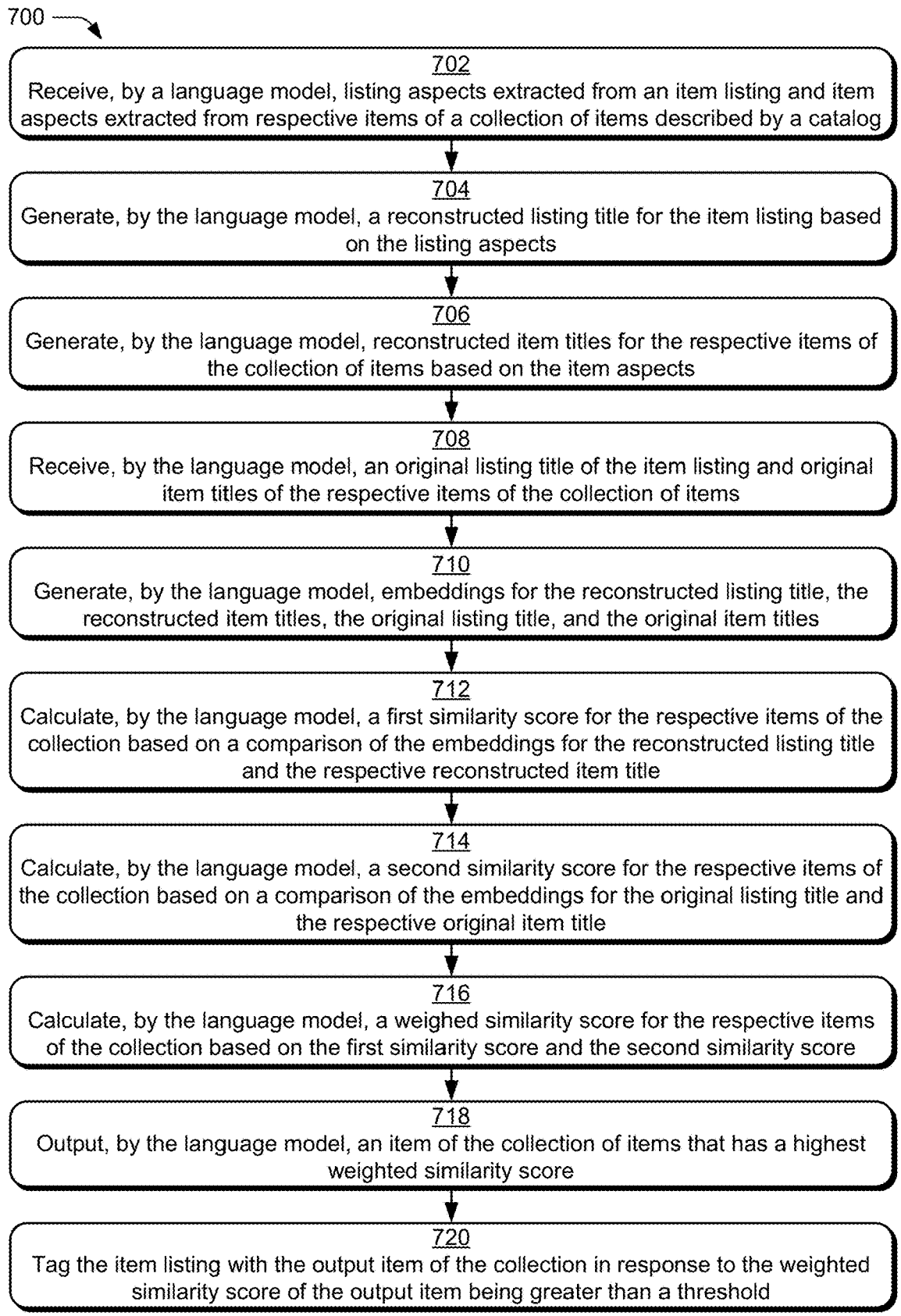
FIG. 7 is a flow diagram depicting an algorithm as a step-by-step procedure in an example of implementing catalog-based item listing enhancement using a language model.

FIG. 7 is a flow diagram depicting an algorithm as a step-by-step procedure 700 in an example of implementing catalog-based item listing enhancement using a language model. In at least one implementation, the procedure 700 is performable by the listing management system 114. Moreover, the procedure 700 may be performed as a part of the procedure 500 of FIG. 5, e.g., at block 512, and/or as a part of the procedure 600 of FIG. 6, e.g., at block 614. Alternatively, the procedure 700 may be performed independently from the procedure 500 and the procedure 600.

Listing aspects extracted from an item listing and item aspects extracted from respective items of a collection of items described by a catalog are received by a language model (block 702). By way of example, aspect categories include features that describe items in the collection and include defined variations that distinguish one item from another. As an illustrative example where the aspect category is garment size, defined variations include small, medium, and large, or a numerical size value. In such an example, the corresponding listing aspect of the item listing is the information provided with respect to garment size (e.g., "small") in the listing data 118. In one or more implementations, the prediction system 128 extracts the listing aspects from the listing data 118 and extracts the item aspects from the catalog 134.

A reconstructed listing title is generated by the language model for the item listing based on the listing aspects (block 704). By way of example, the language model arranges at least a portion of the listing aspects in a text string in a pre-determined order that generates a descriptive title. As such, the reconstructed listing title includes standardized information in a defined order, which may be different than that given in the listing data (e.g., by a user).

Reconstructed item titles for the respective items of the collection of items are generated by the language model based on the item aspects (block 706). By way of example, for respective items of the collection, the language model arranges at least a portion of the item aspects in a text string in a pre-determined order that generates a descriptive title. In at least one implementation, the aspect categories and order used for the reconstructed item titles are the same as those used for the reconstructed listing title in order to standardize the reconstructed listing tile and the reconstructed item titles with respect to each other.

An original listing title of the item listing and original item titles of the respective items of the collection of items are received by the language model (block 708). By way of example, the original listing title of the item listing is included in the listing data 118, e.g., as received from the user. Similarly, the original item titles are received from the catalog 134.

Embeddings for the reconstructed listing title, the reconstructed item titles, the original listing title, and the original item titles are generated by the language model (block 710). By way of example, the embeddings are vector representations or words or tokens in the input reconstructed listing title, reconstructed item titles, original listing title, or the original item title. Embeddings allow words or tokens with similar meanings to be represented by vectors that are close in embedding space, thus denoting semantic similarity and enabling similarity comparisons to be performed, as will be elaborated below.

A first similarity score is calculated by the language model for the respective items of the collection based on a comparison of the embeddings for the reconstructed listing title and the respective reconstructed item title (block 712). By way of example, the first similarity score indicates the semantic similarity of the reconstructed listing title and the respective reconstructed item title. In one or more implementations, the first similarity score is a first cosine similarity score, which ranges from 1 (indicating an exact match) to −1 (indicating diametric opposites). In such examples, a value closer to one indicates greater similarity (e.g., the corresponding embeddings are closer together in the embedding space). However, it is to be appreciated that other similarity measurements may be used without departing from the scope of the described techniques.

A second similarity score is calculated by the language model for the respective items of the collection based on a comparison of the embeddings for the original listing title and the respective original item title (block 714). By way of example, similar to the first similarity score, the second similarity score indicates the semantic similarity of the original listing title and the respective original item title. In one or more implementations, the second similarity score is a second cosine similarity score.

A weighed similarity score is calculated for the respective items of the collection based on the first similarity score and the second similarity score (block 716). By way of example, the weighted similarity score gives more or less weight to the first similarity score relative to the second similarity score. In at least one implementation, weights for the first similarity score and the second similarity score are determined during training of the language model 132, e.g., based on an accuracy of an output match. Additionally or alternatively, the weights are adjusted post-training by the prediction system 128 based on user interaction data for listings matched and tagged via the productization service 122 and/or direct feedback received from the user.

An item of the collection of items that has a highest weighted similarity score is output by the language model (block 718). By way of example, language model 132 compares the weighted similarity score 318 calculated for the items of the collection (e.g., all of the items of the catalog 134) and determines which item of the collection has the highest weighted similarity score 318. As such, the item output by the language model 132 is determined by the language model 132 to be the most similar of the items in the collection to the item listing.

The item listing is tagged with the output item in response to the weighted similarity score of the output item being greater than a threshold (block 720). By way of example, the threshold is a pre-determined, adjustable cut-off value above which the most similar item in the collection is expected to be a match for the item listing. For instance, when the weighted similarity score for all items in the catalog 134 is less than the threshold, the information the listing data 118 cannot be matched to an item in the catalog 134 with high confidence. By tagging the item listing with the output item when the weighted similarity score is greater than the threshold, tagging the item listing with an irrelevant item is avoided.

Tagging the item listing with the output item of the collection causes the information in the catalog 134 for the output item to be automatically associated with the item listing without user intervention. For example, the process of tagging may add searchable metadata from the catalog 134 that describes the output item and provides additional context to the item listing. Additionally or alternatively, at least a portion of the item listing is updated or generated based on the information in the catalog 134 for the output item. The item listing, including the updated information, may be broadcast for display via the listing management user interface 140 and the display device 144.

Example System and Device

Figure 8:
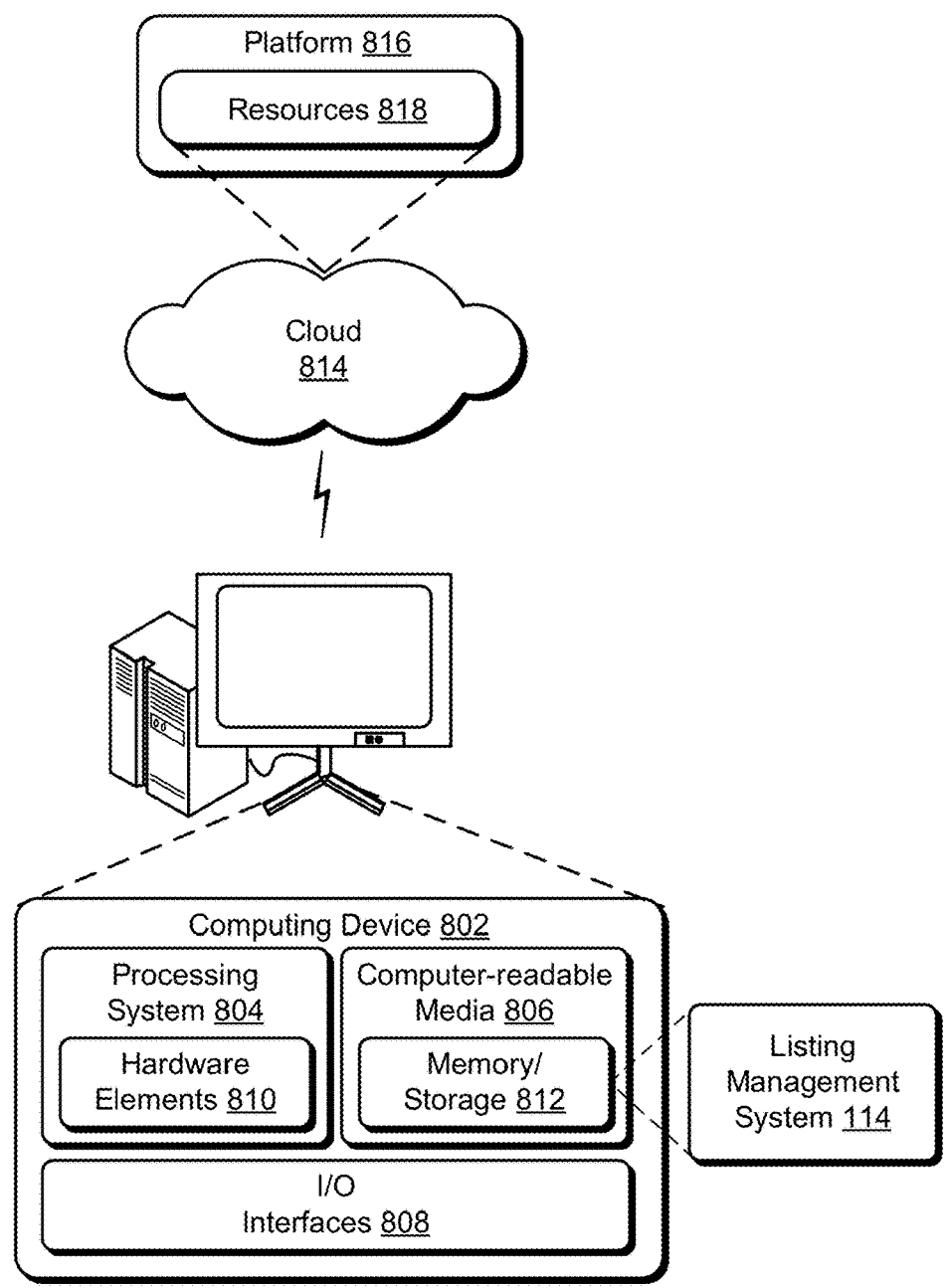
FIG. 8 illustrates an example system including various components of an example device that can be implemented as any type of computing device as described and/or utilized with reference to FIGS. 1-7 to implement embodiments of the techniques described herein.

FIG. 8 illustrates an example of a system generally at 800 that includes an example of a computing device 802 that is representative of one or more computing systems and/or devices that may implement the various techniques described herein. This is illustrated through inclusion of the listing management system 114. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 806 is illustrated as including memory/storage 812. The memory/storage 812 represents memory/storage capacity associated with one or more computer-readable media. The memory/storage 812 may include volatile media (such as random-access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method implemented by a computer for catalog-based item listing enhancement, the method comprising:
   selecting a matching item from a collection of items to match an item listing by at least one of an aspect matching model trained using a catalog of the collection of items and a language model trained using a database of item listings, the selecting including:
   generating, by the language model, listing embeddings for the item listing and item embeddings for individual items of the collection of items;
   calculating similarity scores for the listing embeddings and the item embeddings for the individual items of the collection of items; and
   selecting the matching item from the collection of items based on the similarity scores; and
   updating the item listing based on an entry for the matching item in the catalog.

2. The method of claim 1, wherein the language model is further trained to reconstruct a title for the item listing based on listing aspects of the item listing, and the method further comprises updating the item listing with the reconstructed title.

3. The method of claim 1, wherein the matching item has a highest similarity score of the collection of items.

4. The method of claim 1, wherein a similarity score of the matching item is greater than threshold score.

5. The method of claim 1, wherein updating the item listing based on the entry for the matching item in the catalog comprises updating the item listing with information from the entry automatically and without user intervention.

6. The method of claim 1, further comprising broadcasting the updated item listing to a client device.

7. A system comprising:
   one or more processors; and
   non-transitory computer-readable storage media storing instructions that, responsive to execution by the one or more processors, cause the one or more processors to perform operations comprising:
   selecting a matching item from a collection of items to match an item listing by at least one of an aspect matching model trained using a catalog of the collection of items and a language model trained using a database of item listings, wherein, when the selecting is performed by the language model, the selecting comprises:
   generating, by the language model, listing embeddings for the item listing and item embeddings for individual items of the collection of items;
   calculating similarity scores for the listing embeddings and the item embeddings for the individual items of the collection of items; and
   selecting the matching item from the collection of items based on the similarity scores; and
   updating the item listing based on an entry for the matching item in the catalog.

8. The system of claim 7, wherein, when the selecting is performed by the aspect matching model, the selecting comprises:
   extracting listing aspects of the item listing;
   extracting item aspects of individual items of the collection of items based on the catalog; and
   selecting, by the aspect matching model, the matching item from the collection of items in response to the listing aspects matching the item aspects for a combination of aspect categories learned by the aspect matching model during training.

9. The system of claim 8, wherein the selecting is performed by the language model in response to the listing aspects not matching the item aspects for the combination of aspect categories.

10. The system of claim 7, wherein the matching item has a highest similarity score of the collection of items.

11. The system of claim 7, wherein a similarity score of the matching item is greater than threshold score.

12. The system of claim 7, wherein updating the item listing based on the entry for the matching item in the catalog comprises updating the item listing with information from the entry automatically and without user intervention.

13. The system of claim 7, wherein the operations further comprise broadcasting the updated item listing to a client device.

14. The system of claim 7, wherein the language model is further trained to reconstruct a title for the item listing based on the listing aspects, and the operations further comprise updating the item listing with the reconstructed title.

15. A non-transitory computer-readable storage medium storing instructions that, responsive to execution by one or more processors, causes the one or more processors to perform operations comprising:
   selecting a matching item from a collection of items to match an item listing by at least one of an aspect matching model trained using a catalog of the collection of items and a language model trained using a database of item listings by:
   extracting listing aspects of the item listing;
   extracting item aspects of individual items of the collection of items based on the catalog;
   in response to the listing aspects matching the item aspects for a combination of aspect categories learned by the aspect matching model during training, selecting, by the aspect matching model, the matching item from the collection of items; and in response to the listing aspects not matching the item aspects for the combination of aspect categories:

generating, by the language model, listing embeddings based on the listing aspects and item embeddings for the individual items of the collection of items based on the item aspects;

calculating a similarity score between the listing embeddings and the item embeddings for the individual items of the collection of items; and selecting the matching item from the collection of items based on the similarity score; and updating the item listing based on an entry for the matching item in the catalog.

16. The non-transitory computer-readable storage medium of claim 15, wherein the matching item has a highest similarity score of the collection of items.

17. The non-transitory computer-readable storage medium of claim 15, wherein a similarity score of the matching item is greater than threshold score.

18. The non-transitory computer-readable storage medium of claim 15, wherein updating the item listing based on the entry for the matching item in the catalog comprises updating the item listing with information from the entry automatically and without user intervention.

19. The non-transitory computer-readable storage medium of claim 15, further comprising broadcasting the updated item listing to a client device.

20. The non-transitory computer-readable storage medium of claim 15, wherein the language model is further trained to reconstruct a title for the item listing based on the listing aspects, and the operations further comprise updating the item listing with the reconstructed title.

* * * * *